United States Patent [19]

Kim et al.

[11] Patent Number: 5,647,922

[45] Date of Patent: Jul. 15, 1997

[54] PROCESS FOR MANUFACTURING HIGH MANGANESE HOT ROLLED STEEL SHEET WITHOUT ANY CRACK

[75] Inventors: Tai Woung Kim, Pohang; Young Gil Kim, Seoul; Shin Hwa Park, Pohang, all of Rep. of Korea

[73] Assignees: Pohang Iron & Steel Co., Ltd.; Research Institute of Industrial Science & Technology, both of Pohang, Rep. of Korea

[21] Appl. No.: 553,334

[22] PCT Filed: Mar. 25, 1995

[86] PCT No.: PCT/KR95/00027

§ 371 Date: Nov. 22, 1995

§ 102(e) Date: Nov. 22, 1995

[87] PCT Pub. No.: WO95/26423

PCT Pub. Date: Oct. 5, 1995

[30] Foreign Application Priority Data

Mar. 25, 1994 [KR] Rep. of Korea .................. 1994/6071

[51] Int. Cl.$^6$ .......................................... C21D 7/13

[52] U.S. Cl. .......................... 148/620; 148/541; 148/530; 148/534

[58] Field of Search ..................... 420/72, 73, 74, 420/75; 148/541, 620, 530, 534

[56] References Cited

U.S. PATENT DOCUMENTS 5,431,753  7/1995  Kim et al. .

FOREIGN PATENT DOCUMENTS

| 57-114644 | 7/1982 | Japan . |
| 58-174557 | 10/1983 | Japan . |
| 60-36647 | 2/1985 | Japan . |
| 91 25112 | 12/1991 | Rep. of Korea . |
| 92 13309 | 7/1992 | Rep. of Korea . |

*Primary Examiner*—Deborah Yee
*Attorney, Agent, or Firm*—Webb Ziesenheim Bruening Logsdon Orkin & Hanson, P.C.

[57] ABSTRACT

A high manganese steel having superior hot workability is disclosed, in which small amounts of the alloying elements are added into a high manganese steel of Fe-Mn-Al-C system, so that the rupture strength of the grain boundaries of columnar crystals can be improved, thereby realizing an improved hot workability. Further, a process for manufacturing a high manganese hot rolled steel sheet is disclosed, in which the above mentioned high manganese steel is subjected to be controlled the initial hot rolling conditions during a hot rolling, so that large cracks would not be generated on the edges and on the surface of the hot rolled steel sheet. The process for manufacturing a hot rolled high manganese steel without any cracks includes the following the steps. That is, the process includes the steps of: preparing the ingot or the continuous casting slabs of the conventional Fe-Mn-Al-C steel with one or more elements selected from a group consisting of 0.0005–0.04% of B, 0.0005–0.050% of Ti, 0.0005–0.050% of Zr, 0.0005–0.040% of La, 0.0005–0.040% of Ce, and 0.0005–0.030% of Ca; heating the ingot or the continuous casting slab to a temperature range of 1150°–1300° C.; carrying out a hot rolling by applying a low reduction ratio below 7% per pass and an average strain rate below 2.0 sec$^{-1}$ per pass, until a total reduction ratio reaches 40%; and carrying out a hot rolling by the high reduction ratio after reaching the total reduction ratio of 40%.

6 Claims, 2 Drawing Sheets

PROCESS FOR MANUFACTURING HIGH MANGANESE HOT ROLLED STEEL SHEET WITHOUT ANY CRACK

FIELD OF THE INVENTION

The present invention relates to a high manganese steel and a process for manufacturing a high manganese steel sheet for use in manufacturing automobiles in which a superior formability and a high strength are required. In particular, the present invention relates to an austenitic high manganese steel having superior hot workability in which the reduction of area at high temperature is 40% or more, and also relates to a process for manufacturing a high manganese hot rolled steel sheet, in which cracks are not generated.

DESCRIPTION OF THE PRIOR ART

In accordance with the reinforcement of regulations for the discharges of carbon dioxide which aggravates the air pollution, the automobile manufacturing field requires a steel which is high in the formability and strength, and which can reduce the weight of the automobile and can improve the fuel combustion efficiency.

By considering the formability, the conventional automobile steel sheet is an extremely low carbon steel in which the matrix structure is ferritic. However, in the case where an extremely low carbon steel is used as the automobile steel sheet, the formability is superior, but the tensile strength is low, down to 28–38 $kg/mm^2$. Therefore, not only can the automobile weight not be reduced, but in addition the safety of automobile is aggravated, with the result that human life is jeopardized in the case of an accident.

In an attempt to overcome the above described disadvantages, the present inventors invented a high manganese austenitic steel having superior formability and strength, and filed a patent application under Korean Patent Application No. 25112 (title of the invention: Austenitic High Manganese Steel Having Superior Formability And Strength, filed on Dec. 30, 1991); Korean Patent Application No. 13309 (title of the invention: Method for Manufacturing High Manganese Steel Having Superior Formability, Strength And Weldability, filed on Jul. 24, 1992); and PCT Application No. PCT/KR92/00082 (title of the invention: Austenitic High Manganese Steel Having Superior Formability, Strength and Weldability, And Manufacturing Process thereof, filed on Dec. 30, 1992).

The above mentioned high manganese steel having superior formability and strengths is of Fe-Mn-Al-C system. This steel has the problem that, when it is hot rolled in the usual hot rolling method, cracks are formed on the sides and faces of the steel sheet in a severe degree. If cracks are formed during a hot rolling, not only there is the possibility that the hot rolling mill can be damaged, but also the side portions of the hot rolled steel sheet have to be cut off, and therefore, the intended dimension of the steel sheet cannot be attained. Further, the face of the steel sheet has to be ground off, and therefore, the actual yield of the product is greatly lowered.

Further, this high manganese steel contains large amounts of aluminum and manganese which are alloy elements having a high oxidation trend. Therefore, when the high manganese steel ingot or continuous casting slab is heated to a high temperature, a thick oxide scale layer is formed on the surface by the selective oxidation of the highly oxidizable elements. Further, the alloy elements are depleted in the surface layer, and the selective oxidation also occurs along grain boundaries. The thick oxide scales become a surface defect by being retained after a high temperature processing such as hot rolling. The depletion of the alloy elements and the selective oxidation along grain boundaries cause tiny cracks during a hot rolling. Therefore, the face of the steel sheet has to be ground, with the result that the product yield is decreased.

SUMMARY OF THE INVENTION

The present invention is intended to improve the above described high manganese steel, and to overcome the above described disadvantages of the above described steel.

Therefore it is an object of the present invention to provide a high manganese steel having superior hot workability, in which tiny amounts of alloy elements are added into a high manganese steel of Fe-Mn-Al-C system, so that the strength of columnar crystal grain boundaries is increased. Thereby, improved hot workability can be obtained.

It is another object of the present invention to provide a process for manufacturing a high manganese hot rolled steel sheet in which the above mentioned high manganese steel is subjected to controlling the initial hot rolling conditions during hot rolling, so that large cracks are not generated on the sides and on the surface of the hot rolled steel sheet.

It is still another object of the present invention to provide a process for manufacturing a high manganese hot rolled steel sheet generating no tiny cracks on the surface thereof, in which, when the high manganese ingot or continuous casting slab is heated, it is heated under a non-oxidizing atmosphere, or the heating is made after coating a coating material on the surface, and then, a hot rolling is carried out, so that surface oxide scales, depletion of the alloy elements in the surface layer and the oxidation of hot grain boundaries would be prevented, thereby eliminating tiny cracks.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
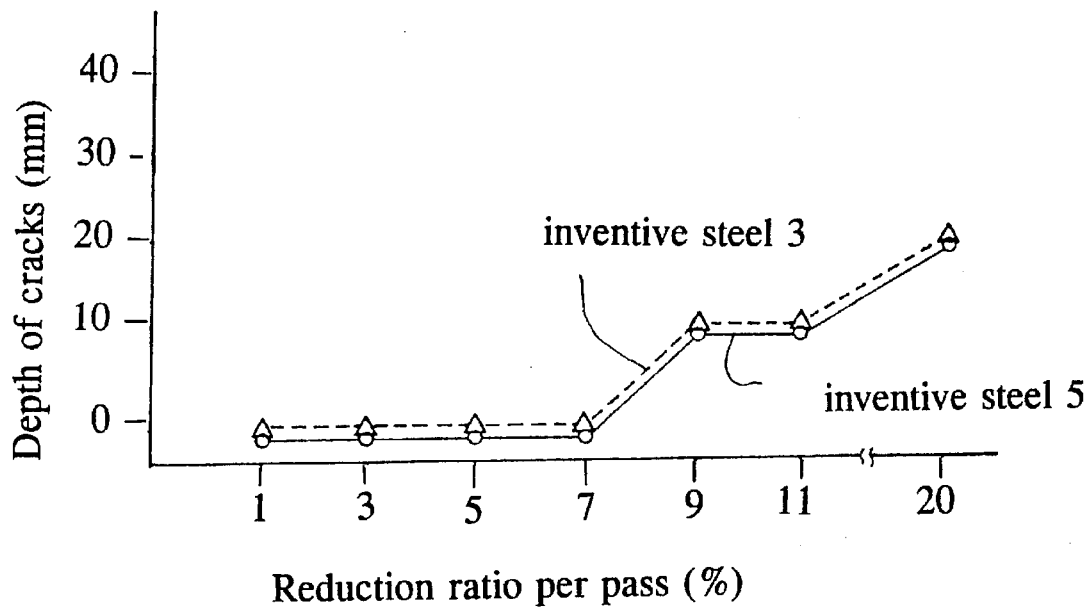
FIG. 1 is a graphical illustration showing the variation of the depth of cracks on edges of the hot rolled steel sheet versus the variation of the reduction ratio per pass during hot rolling of the present invention steel.

The high manganese steel having a superior hot workability according to the present invention includes in weight %: an Fe-Mn-Al-C steel composed of less than 1.5% of C, 15.0–35.0% of Fin, 0.1–6.0% of Al, and balance of Fe and other indispensable impurities; and further includes one or more elements selected from a group consisting of 0.0005–0.04% of B, 0.0005–0.050% of Ti, 0.0005–0.050% of Zr, 0.0005–0.040% of La, 0.0005–0.040% of Ce, and 0.0005– 0.030% of Ca, a reduction of area during high temperature rolling being 40% or more.

In another aspect of the present invention, the high manganese steel having a superior hot workability according to the present invention includes in weight %: an Fe-Mn-Al-C steel composed of less than 1.5% of C, 15.0–35.0% of Mn, 0.1–6.0% of Al, and balance of Fe and other indispensable impurities; further includes one or more elements selected from a group consisting of less than 0.6% of Si, less than 5.0% of Cu, less than 1.0% of Nb, less than 0.5% of V, less than 9.0% of Cr, less than 4.0% of Ni, and less than 0.2% of N; and further includes one or more elements selected from a group consisting of 0.0005–0.04% of B, 0.0005–0.050% of Ti, 0.0005–0.050% of Zr, 0.0005–0.040% of La, 0.00050–0.040% of Ce, and 0.0005–0.030% of Ca, a reduction of area during high temperature rolling being 40% or more.

According to the present invention, the high manganese steel ingot or continuous casting slab composed as described above is heated to a temperature of 1150°–1300° C., and then, a light hot rolling is carried out with a reduction ratio of less than 7% per rolling pass until the total reduction ratio reaches 40%. The average strain rate is kept at less than 2.0 $sec^{-1}$ during light hot rolling. After attaining to the total reduction ratio of 40%, a heavy hot rolling by the high reduction ratio of 20% or more per rolling pass can be applied. Thereby, a high manganese hot rolled steel sheet can be manufactured without any cracks.

In the method for hot-rolling the high manganese steel according to the present invention, when the high manganese steel ingot or continuous casting slab is heated to a temperature of 1150°–1300° C., a non-oxidizing atmosphere or a coating material is used. Thus the surface oxidation is inhibited, so that surface defects caused by oxide scales can be prevented, and that a depletion of alloying elements and an oxidation of hot grain boundaries would be prevented, thereby eliminating tiny cracks.

Now the high manganese steel of the present invention in which the hot workability is improved by adding grain boundary strengthening elements will be described in further details.

In the high manganese steel of Fe-Mn-Al-C system of the present invention, in order to prevent the brittleness of the cast structure, i.e., in order to prevent the brittleness of the grain boundaries of columnar crystals, an agent for reinforcing the grain boundaries of the columnar crystals is added. Thus the rupture strength of the grain boundaries of the columnar crystals is improved, thereby improving the hot workability.

The high manganese steel of Fe-Mn-Al-C system having superior formability and strengths contains a large amount of aluminum. Therefore, aluminum is segregated on the grain boundaries of columnar crystals during solidification, and a low melting point inter-metallic compound such as $Fe_2Al_5$ having a melting point of about 1170° C. comes to exist on the grain boundaries of columnar crystals. When the high manganese steel ingot or the continuous casting slab is heated to the above mentioned melting point or over, the low melting point compound is melted, with the result that a liquid film having a thickness of 1000 Å is formed on the grain boundaries of the columnar crystals. On the other hand, if the temperature drops to below the above mentioned melting point, the nitrogen, dissolved in the liquid film, reacts with aluminum and forms coarse aluminum nitride (AlN) precipitates more than 10 μm along the grain boundaries of columnar crystals.

The present inventors confirmed that the above described liquid film and the coarse aluminum nitride precipitates existing on the grain boundaries of the columnar crystals cause a weakness in the casting structure. This fact has not been known so far.

In the present invention, small amounts of one or more elements selected from a group consisting of boron (B), titanium (Ti), zirconium (Zr), lanthanum (La), cerium (Ce) and calcium (Ca) are added into the high manganese steel of Fe-Mn-Al-C system. Consequently, the small amounts of the elements are in solid solution on the grain boundaries of the columnar crystals to raise the melting point of the low melting point compound to about 1300° C., or they form nitride preferentially to prevent the precipitation of aluminum, or they spheroidize non-metallic materials to strengthen the grain boundaries of the columnar crystals, or they inhibit the growth of the columnar structures and promotes the growth of the equiaxed crystal structure. Thus the high manganese steel of the present invention in which the reduction of area in the high temperature is 40% or more is provided.

Now the reason why the elements are selected and limited to the mentioned ranges will be described.

Carbon (C) increases the stacking fault energy, and therefore, improves the stability of austenite. However, if its content is more than 1.5 weight % (to be called % below), the elongation and formability are aggravated. Therefore, it is desirable to limit the content of carbon to less than 1.5%.

Manganese (Mn) is an element which is indispensable for the increase of strengths and for stabilizing the austenitic phase. However, if its content is less than 15.0%, there is formed an $\alpha'$-martensitic phase which aggravates the formability. On the other hand, if its content is more than 35%, the stacking fault energy is too much increased, with the result that the formation of deformation twins is inhibited during press forming, and that a formability suitable for an automobile steel sheet cannot be obtained. Therefore, it is desirable that the content of manganese is limited to a range of 15.0–35.0%.

Aluminum (Al) is an important element which stabilizes the austenitic phase like carbon, and improves the rolling and press-forming properties. Further, in combination with manganese, it properly adjust the value of the stacking fault energy, so that the deformation twins would be well formed. However, if the content of Al is less than 0.1%, the strength of the steel is increased by the formation of ∈-martensite, but the elongation is aggravated, with the result that the workability and press-formability are aggravated. Meanwhile if its content exceeds 6.0%, the stacking fault energy is excessively increased as much as inhibit the formation of deformation twins, with the result that the formability is lowered. Therefore it is desirable that the content of aluminum should be limited to a range of 0.1–6.0%.

Silicon is added to be a deoxidizing agent and to increase the strengths through a solid-solution strengthening. If its content is more than 0.6%, the deoxidation effect is saturated, with the result that the paintability and weldability are aggravated in car manufacturing. Therefore, the content of Si should desirably be limited to less than 0.6%.

Copper (Cu) is added for improving the corrosion resistance, and for increasing the strengths through a solid solution strengthening. If its content exceeds 5.0%, a hot shortness is caused aggravating the hot workability.

Therefore, the content of Cu should desirably be limited to less than 5.0%.

Niobium (Nb) and vanadium (V) are added to improve the strengths through a solid solution strengthening. If the content of Nb is more than 1.0%, then cracks are formed during a hot rolling, while if the content of V is more than 0.5%, then low melting point compounds aggravating the hot workability. Therefore, the contents of Nb and V should desirably be limited to less than 1.0% and less than 0.5%, respectively.

Chromium (Cr) and nickel (Ni) are added for stabilizing the austenitic phase to inhibit the formation of α'-martensite, and for improving the strengths through a solid solution strengthening. If the content of Cr is less than 9.0%, then the austenitic phase is stabilized, and the hot workability is improved preventing the formation of cracks and a surface oxidation during a slab heating and a hot rolling. However, if it exceeds 9.0%, the formability is aggravated. Therefore, the content of Cr should desirably be limited to less than 9.0%. Nickel (Ni) improves the mechanical properties such as elongation and impact strength, but if its content exceeds 4.0%, the addition effect is saturated. Therefore its content should desirably be limited to less than 4.0% by taking into account the economic aspect.

Nitrogen (N) reacts with Al during solidifying and hot rolling process, and forms fine aluminium nitride of less than 0.1 μm. These fine nitrides act as nucleation sites for deformation twins not only to promote the formation of the deformation twins, but also to make the fine size of the deformation twins. Thus the strengths and formability are improved. However, if its content exceeds 0.2%, the nitride are precipitated in excessive amounts, with the result that the hot workability and elongation are aggravated. Therefore, the content of N should desirably be limited to less than 0.2%.

Boron (B) is solid-solved at above 1000° C. so as to inhibit the mobility and formation of vacancies, and raises the melting point of the low melting point compounds on the grain boundaries of the columnar crystals to above 1300° C., thereby strengthening the grain boundaries of the columnar crystals. However, if its content is less than 0.0005%, no effect is obtained. On the other hand, if its content exceeds 0.040%, large amounts of boron carbides and boron nitride are produced to serve as nucleation sites for aluminum nitride precipitates, with the result that the formation of the aluminum nitride precipitates is promoted, and that the grain boundaries of the columnar crystals become brittle. Therefore, the content of boron should desirably be limited to a range of 0.0005–0.040%.

Titanium (Ti) and zirconium (Zr) are in solid solution on the grain boundaries of the columnar crystals. They inhibit the precipitations of coarse aluminum nitride which are the cause of the brittleness of the grain boundaries of the columnar crystals, thereby strengthening the grain boundaries of the columnar crystals. However, if the contents of Ti and Zr are less 0.0005%, respectively, no effect can be obtained, while if the contents of these elements exceed 0.050%, then excessive amounts of Ti and Zr are segregated on the grain boundaries so as to make the grain boundaries brittle. Therefore, the contents of Ti and Zr should desirably be limited to 0.0005–0.050%.

Calcium (Ca) reacts with non-metallic materials such as $Al_2O_3$, MnO, and MnS within the melted steel so as to spheroidize the non-metallic materials, thereby increasing the rupture strength of the grain boundaries of the columnar crystals. However, if the content of Ca is less than 0.0005%, no effect can be obtained, while if its content exceeds 0.030%, the effect is saturated. Therefore, the content of Ca should desirably be limited to a range of 0.0005–0.030%.

Lanthanum (La) and cerium (Ce) which are rare earth elements form the nucleus of dendrite structures so as to make the dendrite structures fine. Thus they inhibit the growth of the columnar crystal structures, and promote the growth of the equiaxial crystal structures. Thus they reduce the size and amount of the columnar crystals which cause the weak grain boundary strength. Further, they increases the amount of the equiaxial crystals which have a superior high grain boundary strength, thereby improving the hot workability of the casting structure.

Further, La and Ce react with phosphorus (P) and sulphur (S) which lower the grain boundary strength by being segregated on the grain boundaries, thereby alleviating the adverse effect of P and S. However, if the contents of La and Ce are less than 0.0005%, no effect can be obtained, while if the contents of them exceeds 0.040%, then the effects are saturated. Therefore, the contents of La and Ce should desirably be limited to 0.0005–0.040%.

Now the method for hot-rolling the high manganese steel according to the present invention will be described.

If small amounts of alloying elements are added into the Fe-Mn-Al-C system high manganese steel according to the present invention, the grain boundaries are strengthened as above mentioned. However, it is strengthened not more than the general carbon steel. Therefore, if cracks are not to be formed during a hot rolling, hot rolling conditions should be properly controlled.

The cause of the generation of cracks in the Fe-Mn-Al-C system high manganese steel is as follows. That is, cracks are caused due to the weakness of the grain boundaries of the columnar crystals, and due to the fact that the deformation stress applied per unit area on the grain boundaries of the columnar crystals during a hot rolling exceeds the rupture strength of the grain boundaries of the columnar crystals. If a hot rolling is carried out by applying a deformation stress lower than the rupture strength of the grain boundaries of the columnar crystals of the high manganese steel of the present invention, such cracks can be avoided during hot rolling.

The method of the present invention is based on the way not to cause crack during hot rolling not only by increasing the grain boundary strength of columnar crystal by adding the alloying elements, but also by applying the lower deformation stress than the rupture strength of grain boundaries.

In the present invention, a low reduction ratio per pass and a low average strain rate per pass are applied at the initial stage of the hot rolling, until the brittle cast structure is converted into a tough rolled structure by recrystallization. By the change of the cast structure to the rolled structure, cracks are not formed at all during subsequent severe hot rolling by a high reduction ratio of 20%, per pass and by an average strain rate of 10 $sec^{-1}$. This is the principal feature of the present invention.

That is, in the present invention, the high manganese steel ingot or continuous casting slab having the above described chemical composition is heated to 1150°–1300° C., and then, a hot rolling is carried out with a reduction ratio of 7% per rolling pass and with an average strain rate of 2.0 $sec^{-1}$ per pass until the total reduction ratio becomes 40%. After reaching to the total reduction ratio of 40%, the hot rolling is carried out with a high reduction rate, thereby manufacturing a high manganese hot rolled steel sheet without any cracks.

Now the reason for selecting the hot rolling conditions and the reason for limiting the ranges will be described.

In manufacturing the high manganese steel sheet, the continuous casting method (melting—continuous casting—rolling) and the ingot making method (melting—ingot making—bloom rolling—hot rolling) can be used. However, for the reason of economy, the continuous casting method is widely used.

In manufacturing the high manganese steel of Fe-Mn-Al-C C system, the weakness of the cast structure causes trouble in hot rolling. Therefore, the above mentioned hot workability is related to the initial stage of hot rolling. That is, in the continuous casting method, the above mentioned limiting conditions are applied to the hot rolling process.

On the contrary, in the ingot making method, these conditions are applied to the slab making process.

In the present invention, the heating temperature for the high manganese steel ingot or continuous casting slab during the hot rolling should desirably be limited to 1150°–1300° C. The reason why the upper limit of the heating temperature is 1300° C. is that the melting point of the low melting point compounds on the grain boundaries of the columnar crystals has been raised to 1300° C. by adding tiny amounts of alloying elements for strengthening the grain boundaries of the columnar crystals. Therefore, if the heating is made to above 1300° C., a liquid phase film is formed on the grain boundaries of the columnar crystals, with the result that cracks are formed at the first pass of the hot rolling.

Further, if the high manganese steel ingot or the continuous casting slab is heated to above 1300° C., then vacancies are excessively formed within the high manganese steel ingot or continuous casting slab, with the result that the stacking fault energy will be changed. This change of stacking fault energy will affect the formation of the deformation induced twins, with the result that it is difficult to obtain high strengths and formability which is obtained by the deformation induced twins.

Meanwhile, the reason why the lower limit of the heating temperature is 1150° C. is that, if the heating temperature is too low, the segregation of the alloy elements cannot be sufficiently eliminated. Consequently, the stacking fault energy is adversely affected. Therefore, the formation of the deformation induced twins (which improve the strengths and the formability) would be inhibited. Further, the temperature interval to the finishing rolling temperature is narrow, and therefore, a sufficient rolling down to the required thickness cannot be carried out.

Meanwhile, the limiting conditions for the reduction rate per pass and the average strain rate per pass in the hot rolling are as follows.

Even though in the high manganese steel of the present invention, small amounts of alloying elements such as B, Ti, Zr, La, Ce and Ca are added to strengthen the grain boundaries of the columnar crystals, the rupture strength of it is not strengthened to the level of the general carbon steel. Therefore, if it is hot-rolled with an excessive reduction rate at the initial stage of the hot rolling, then the applied deformation stress exceeds the rupture strength of the grain boundaries of the columnar crystals, thereby forming cracks.

Therefore, at the initial stage of the hot rolling, it is desirable to limit the reduction ratio per pass to less than 7% and the average strain rate per pass to less than 2.0 sec$^{-1}$, until the total reduction ratio reaches 40%, so that the weak casting structure would be converted to a tough rolling structure without forming cracks.

The reduction ratio is defined as follows.

$$\frac{ho - h1}{ho} \times 100 \ (\%)$$

where ho represents the thickness of input sheet, and h1 represents the thickness of output sheet.

The average strain rate which is a function of the rolling speed and the reduction ratio is expressed as follows.

$$Wm = (Vu/Ld) \times W$$

where,
Wm: the average strain rate,
Vu: the peripheral velocity of the rolls (mm/sec),
Ld: the projected length of the contact arc,
Ld={(roll radius)×(thickness of input sheet−output sheet)}$^{1/2}$,
W: logarithmic deformation rate $$\left( \ln \frac{ho}{h1} \right),$$

If the reduction ratio per pass exceeds 7%, or if the strain rate per pass exceeds 2.0 sec$^{-1}$ then cracks are formed. Therefore, the above limitations are desirable.

When the total reduction ratio reaches 40%, the weak casting structures are all converted to the tough rolling structure with equiaxed grains by the recrystallization. Therefore, cracks are not formed even if a high reduction ratio is applied.

The hot rolling conditions will be described in more detail by taking an example, in which a continuous casting slab of 80 mm is to be hot-rolled into a sheet of 3 mm. Until the total reduction ratio reaches 40%, that is, until the slab is reduced to 48 mm, a initial rolling should be carried out by applying a reduction ratio of 7% per pass and an average strain rate of 2.0 sec$^{-1}$ per pass.

Thereafter, the subsequent high reduction ratio can be applied without causing cracks in the hot rolled steel sheet.

Meanwhile, the high manganese steel of Fe-Mn-Al-C system having superior formability and strengths contains large amounts of manganese, aluminum and carbon. Therefore, when the ingot or the continuous casting slab is heated to a high temperature for carrying out a hot rolling, a thick oxide scale layer is formed on the surface, and de-manganizing, de-aluminizing and decarburizing phenomena occur on the surface due to the oxidation reactions. Consequently, a depletion layer of alloying elements is formed, and the selective oxidations of alloying elements occur along the austenitic grain boundaries.

As a result, the following problems occur on the surface of the steel sheet after carrying out a hot rolling.

The thick oxide scales which have been formed in a heating furnace remain on the final hot rolled steel sheet, with the result that surface defects are formed on the final rolled steel sheet, and that the product yield is decreased. Further, the alloying element depletion phenomenon and the grain boundary oxidizing phenomenon, which occur when the ingot or the continuous casting slab is heated to a high temperature, cause the formation of tiny cracks on the surface of the steel sheet.

The high manganese steel of Fe-Mn-Al-C system having superior formability and strengths contains large amounts of alloy elements such as manganese, aluminum and carbon which are highly oxidizable. Therefore, even if there is a small amount of oxygen within the heating furnace, oxides are easily formed.

Within the conventional heating furnace using COG (Cokes Oven Gas) or BFG (Blast Furnace Gas), there is usually oxygen. Therefore, the surface of the steel ingot or the continuous casting slab of the high manganese steel contacts with oxygen, and then, manganese, aluminum and carbon which are more oxidizable than iron (Fe) are oxidized on the surface, forming oxide scales. Further, manganese, aluminum and carbon which exist inside of the surface migrate to the surface by the diffusion, thereby forming thick oxide scales on the surface.

Meanwhile, the inner manganese, aluminum and carbon move toward the surface of the ingot or the continuous casting slab of the high manganese steel being oxidized on the surface. Therefore, the depletion of manganese, aluminum and carbon occurs, with the result that a de-manganized layer, a de-aluminized layer and a decarburized layer are formed.

The depleted layer of these alloying elements of the ingot or the continuous casting slab of the high manganese steel causes fine cracks on the steel surface after the hot rolling.

Meanwhile, when the depleted layers are formed to a certain depth, and the alloying elements cannot move toward the surface any more, the oxygen intrudes along the grain boundaries to generate grain boundary oxidations.

On the grain boundaries, manganese, aluminum and carbon which are highly oxidizable alloying elements are segregated and concentrated. Further, on the grain boundaries, the atomic arrangement is not dense, and therefore, oxygen can easily intrude to cause grain boundary oxidations.

The grain boundary oxidation can occur down to a depth of 1 mm, and this forms tiny cracks on the surface of the steel sheet after carrying out a hot rolling.

Generally, the heating furnace for carrying out the hot rolling and the ingot rolling is heated by means of a heavy oil or a COG which is obtained in a steel manufacturing plant as a byproduct.

If a fuel is to be burnt, oxygen is required. Therefore, the oxidation of the ingot or continuous casting slab cannot be avoided during the heating process.

In the case of the high manganese steel of the present invention in which large amounts of highly oxidizable manganese, aluminum and carbon are contained, a surface oxidation problem, an alloying element depletion layer problem and a grain boundary oxidation problem necessarily occur.

When the ingot or continuous casting slab of the high manganese steel of the present invention is hot rolled, an oxidation within the heating furnace can be inhibited by coating the coating material on the surface of the ingot or continuous casting slab of the high manganese steel, or by using a non-oxidizing atmosphere within the heating furnace. As a result, the alloying element depletion and the grain boundary oxidation can be prevented, and consequently, the formation of tiny cracks on the surface of the hot rolled steel sheet can be prevented. This is the principal feature of the present invention.

The coating material protects the ingot or the continuous casting slab from the atmospheric gas at a high temperature. Therefore, if the coating material is coated on ingot or continuous casting slab, the coating material prevents the ingot or casting slab from being directly contacted with oxygen. Meanwhile, in the case where a heating is carried out under a non-oxidizing atmosphere, an inert gas such as nitrogen ($N_2$) or argon (Ar), prevents the ingot from being directly contacted with the atmospheric gas.

The appropriate coating material should be such a thing which contains chrome by 80 weight % as the major ingredient. There is no alloying element which is more oxidizable than Mn and Al, and therefore, there is no element which can prevent the oxidation of Mn and Al by being oxidized before Mn and Al.

However, chrome, used for a coating material, forms a dense oxide film on the surface of the ingot or continuous casting slab of the high manganese steel, so that the intrusion of oxygen can be prevented.

The coating material is coated by using a brush or through spraying, and a drying should be preferably carried out in the air.

Meanwhile, in the case where an inert gas such as nitrogen or argon gas is purged into the heating furnace to provide a non-oxidizing atmosphere within the furnace, the ingot or the continuous casting slab of the high manganese steel is prevented from being directly contacted with oxygen, thereby preventing oxidation.

If the ingot or the continuous casting slab of the high manganese steel is to be protected from a surface oxidation, the proportion of nitrogen or argon gas should be preferably 99% or more.

If there is 1% or less of oxygen, a thin oxide scale layer is formed on the surface of the steel ingot or continuous casting slab, but it is easily removed by the jet of high pressure water during the hot rolling, with the result that no surface defect is generated on the steel sheet.

Meanwhile, an argon gas does not react with the high manganese steel at all, but nitrogen reacts with aluminum on the surface of the ingot or the continuous casting slab and then makes fine aluminum nitrides in small amounts. However, it does not lead to the formation of surface defects.

Rather, the aluminum nitride precipitates serve as nucleation sites for the deformation induced twins, with the result that the final strengths and formability are improved.

In the case where a non-oxidizing atmosphere is formed within the heating furnace by using nitrogen or argon gas, there is not oxygen within the heating furnace, and therefore, the direct heating method, burning a fuel cannot be applied. Therefore, an indirect heating such as an electric resistance heating is desirable, because in this case oxygen is not necessary.

If the coating material is not used, or if the inert gas is not purged within the heating furnace, the oxygen within the high temperature heating furnace reacts with the surface of the ingot or the continuous casting slab so as to form a thick oxide scale layer. Further, de-manganizing, de-aluminizing and decarburizing phenomena occur to deplete the alloying elements in the surface layer, and to cause grain boundary oxidations along the grain boundaries. The thick oxide scale layer remains on the surface of the steel sheet even after the hot rolling, thereby causing surface defects.

Further, the depletion layer of the alloying element and the grain boundary oxidation alter the various properties of the surface layer, with the result that tiny cracks are formed during the hot rolling.

On the other hand, in the case where a coating material is coated, or where a non-oxidizing atmosphere is purged within the heating furnace by charging nitrogen or argon gas, an oxidizing reaction on the surface is inhibited to prevent the formation of a surface oxide scale layer, as well as preventing the formation of the depletion layer of alloying element and the grain boundary oxidation.

Consequently, the formation of tiny cracks on the surface is prevented during the hot rolling.

Therefore, when the steel ingot or continuous casting slab of the high manganese steel is heated in a heating furnace, to inhibit the surface oxidation, to prevent the depletion layer of the alloying element and the grain boundary oxidation and to avoid the formation of tiny cracks on the surface of steel sheet during the hot rolling, it is desirable that the coating material is coated, or that a nitrogen or argon gas is purged within the heating furnace.

Now the present invention will be described in further detail based on actual examples.

EXAMPLE 1

High manganese steels having the compositions of Table 1 below were casted into ingots of 50 kg with a thickness of 160 mm. Further, continuous casting slabs having thickness of 80 mm were made by using a simulation continuous casting machine.

| Steel No. | | C | Mn | Al | Chemical composition others | B | Ti | Zr | La | Ce | Ca |
|---|---|---|---|---|---|---|---|---|---|---|---|
| Inventive | 1 | 0.34 | 23.8 | 1.1 | 0.06 N | 0.015 | — | — | — | — | — |
| | 2 | 0.57 | 19.3 | 3.7 | 0.14 N | 0.006 | 0.011 | — | — | — | 0.006 |
| | 3 | 0.81 | 31.0 | 2.1 | 0.01 N | 0.001 | 0.044 | — | — | 0.001 | — |
| | 4 | 0.13 | 16.8 | 5.2 | 2.9 Ni | 0.007 | — | — | 0.036 | — | 0.015 |
| | 5 | 0.68 | 27.4 | 1.5 | 0.5 Cu | — | — | 0.004 | — | 0.038 | — |
| | 6 | 1.18 | 32.8 | 0.3 | 1.2 Cr | — | 0.020 | — | 0.001 | — | — |
| | 7 | 0.08 | 24.6 | 3.2 | 0.1 Nb | — | — | 0.045 | — | — | 0.028 |
| | 8 | 0.94 | 20.3 | 1.8 | 0.3 V | 0.004 | — | — | — | 0.035 | — |
| | 9 | 0.45 | 27.1 | 2.0 | 0.08 N | 0.009 | 0.032 | — | 0.013 | — | 0.015 |
| | 10 | 0.53 | 25.4 | 1.5 | 0.07 N | 0.013 | 0.18 | — | — | 0.010 | 0.027 |
| | 11 | 0.62 | 23.6 | 1.8 | 0.08 N | 0.010 | — | 0.025 | — | 0.018 | 0.008 |
| Comparative | 12 | 0.38 | 23.0 | 1.2 | 0.04 N | — | — | — | — | — | — |
| | 13 | 0.51 | 20.5 | 3.5 | 0.11 N | 0.0003 | — | — | 0.0002 | — | 0.0004 |
| | 14 | 0.70 | 31.0 | 2.5 | 1.8 Ni | 0.065 | 0.003 | — | 0.0027 | — | 0.038 |
| | 15 | 0.08 | 16.5 | 5.7 | 1.1 Cu | — | 0.0003 | — | — | 0.0004 | — |
| | 16 | 0.77 | 26.5 | 1.5 | 2.3 Cr | 0.043 | 0.054 | 0.018 | — | 0.0020 | — |
| | 17 | 1.02 | 33.4 | 0.2 | 0.2 Nb | — | — | 0.052 | 0.048 | — | — |
| | 18 | 0.11 | 25.3 | 3.1 | 0.2 V | — | — | — | — | 0.042 | 0.024 |
| Conventional | 19 | 0.002 | 0.6 | 0.03 | — | — | 0.043 | — | — | — | — |

The ingot and the continuous casting slab were cut down to a tensile test specimen by the electric discharge machine. In order to inspect the hot rolling quality for the weak grain boundaries of the columnar crystals, a spherical tensile test specimen having a diameter of 10 mm was prepared in such a manner that the columnar structures of the ingot and the continuous casting slab should be perpendicular to the loading direction of the tensile test.

To measure the reduction of area, the high temperature tensile test were performed three times at a temperature range of 900°–1300° C. and the $10^{-5}$ Torr of vacuum by a high temperature tensile testing machine (Gleeble). The reduction of area was measured each time, and the average values are shown in Table 2 below.

The reduction of area, which shows the hot workability is defined as follows.

Reduction of area (R.A.) =

$$\frac{\text{The amounts of the reduction of area after test}}{\text{Sectional area of specimen before test}} \times 100 \, (\%)$$

TABLE 2

| | Reduction of area for different temperatures | | | | |
|---|---|---|---|---|---|
| Steel No. | 900° C. | 1000° C. | 1100° C. | 1200° C. | 1300° C. |
| Inventive 1 | 41 | 45 | 50 | 52 | 53 |
| 2 | 40 | 47 | 49 | 50 | 50 |
| 3 | 41 | 44 | 50 | 51 | 52 |
| 4 | 40 | 40 | 49 | 49 | 49 |
| 5 | 40 | 42 | 48 | 52 | 53 |
| 6 | 41 | 41 | 49 | 49 | 52 |
| 7 | 41 | 44 | 49 | 49 | 50 |
| 8 | 40 | 47 | 49 | 50 | 51 |

TABLE 2-continued

| | Reduction of area for different temperatures | | | | |
|---|---|---|---|---|---|
| Steel No. | 900° C. | 1000° C. | 1100° C. | 1200° C. | 1300° C. |
| 9 | 45 | 52 | 58 | 59 | 61 |
| 10 | 44 | 50 | 58 | 60 | 60 |
| 11 | 44 | 49 | 55 | 57 | 57 |
| Comparatv 12 | 28 | 5 | 3 | 2 | 2 |
| 13 | 22 | 4 | 2 | 1 | 0.5 |
| 14 | 16 | 18 | 18 | 17 | 18 |
| 15 | 18 | 5 | 2 | 1 | 1 |
| 16 | 21 | 21 | 23 | 22 | 22 |
| 17 | 22 | 20 | 23 | 21 | 22 |
| 18 | 20 | 18 | 17 | 17 | 17 |
| Conventi 19 | 65 | 81 | 83 | 87 | 90 |

As shown in Table 2 above, in the case of the inventive steels 1–8 which come within the composition range of the present invention, there are added one or two elements selected from an alloying element group consisting of B, Ti, Zr, La, Ce and Ca for strengthening the grain boundaries of the columnar crystals. In this case, the reduction of area is over 40% at 900° C. or over, and this is a significant improvement over the comparative steels.

Particularly, in the case of the inventive steels 9–11 in which 4 elements were added by selecting from among B, Ti, Zr, La, Ce and Ca, the sectional area reduction rate is more superior.

On the other hand, in the case of the comparative steels 12, 13 and 15 in which the addition of the alloy elements comes short of the addition ranges of the present invention, the reduction of area is extremely low above 1000° C. Further, it is seen that the grain boundaries of the columnar crystals are not strengthened due to an insufficient effect of the alloying elements. In the case of the comparative steels 14 and 16, B, Ca and Ti are added in excessive amounts, while in the case of the comparative steels 17 and 18, Zr, La and Ce are added in excessive amounts. Therefore, it is seen that the brittleness of the grain boundaries of the columnar crystals comes from the excessive addition of these elements.

EXAMPLE 2

In order to investigate the optimum heating temperature for the high manganese steel, the inventive steel 3 of Example 1 was heated for 5 hours at 1150° C., 1250° C., 1300° C. and 1350° C. respectively. After such heating, steel ingots of a 160 mm thickness and continuous casting slabs of an 80 mm thickness were hot-rolled by applying a reduction ratio of 7% per pass and an average strain rate of 2.0 sec$^{-1}$ per pass until the total reduction rate reached 40%. After reaching the total reduction rate of 40%, a hot rolling was carried out by applying a reduction ratio of 20% per pass and an average strain rate of 20 sec$^{-1}$ per pass down to a thickness of 3 mm. After the hot rolling, the depths of the side cracks for both the ingot and the continuous casting slab showed the same level. The depths of the cracks were measured, and the results are shown in Table 3 below.

TABLE 3

| Steel No. | | Heating temp | Material | Depth of side cracks |
|---|---|---|---|---|
| Comparatv | 20 | 1350° C. | Ingot | 30 mm |
| | | | C casting slab | 25 mm |
| Inventive | 21 | 1300° C. | Ingot | 0 |
| | | | C casting slab | 0 |
| | 22 | 1250° C. | Ingot | 0 |
| | | | C casting slab | 0 |
| | 23 | 1150° C. | Ingot | 0 |
| | | | C casting slab | 0 |

As shown in Table 3, the inventive steels 21-23 which were heated within the temperature range of the present invention, i.e., at 1300° C., 1250° C. and 1150° C. showed no cracks in both the steel ingot and the continuous casting slab. However, the comparative steel 20 which departed from the heating temperature range of the present invention and which was heated to 1350° C., generated cracks of 25-30 mm in both the steel ingot and the continuous casting slab. Since the comparative steel 20 was heated at 1350° C., in spite of the fact that the columnar crystal grain boundary strengthening elements were added, a liquid film was formed on the grain boundaries of the columnar crystals, with the result that the grain boundaries of the columnar crystals became brittle, and that cracks were formed during the hot rolling. Therefore, it is confirmed that, not to make the grain boundaries of the columnar crystal brittle, the heating temperature should be below 1300° C. which is the upper limit of the heating temperature range of the present invention.

As described above, if cracks are not formed during the hot rolling, the upper limit of the heating temperature should be below 1300° C. Meanwhile, the lower limit of the heating temperature should be 1150° C., because a sufficiently high temperature level is required to attenuate the segregation, and to assure the roll finishing temperature during rolling to the final thickness.

EXAMPLE 3

In order to set the reduction ratio per pass and the average strain rate per pass at which cracks are not formed during the hot rolling, an ingot and a continuous casting slab of the inventive steels 3 and 5 were heated at a temperature of 1250° C. for 5 hours. Then the hot rolling was carried out changing the reduction ratio in the range of 1–20% per pass and the average strain rate of 0.5–20 sec$^{-1}$ per pass until the total reduction ratio reached 40%. Then the crack depths were measured, and the results are shown in FIGS. 1 and 2.

Here, the generation of cracks showed no difference between the ingot and the continuous casting slab, and this owes to the fact that both the ingot and the continuous casting slab have a casting structure before carrying out the hot rolling.

As shown in FIG. 1, the inventive steels 3 and 5 showed no generation of cracks, when a reduction rate below 7% per pass was applied. This is because of the fact that the deformation stress applied during the hot rolling was lower than the rupture strength of the grain boundaries of the columnar crystals. However, when the reduction ratio of 9% per pass was applied, cracks were formed. This is due to the fact that the deformation stress applied during the hot rolling exceeded the rupture strength of the grain boundaries of the columnar crystals.

Figure 2:
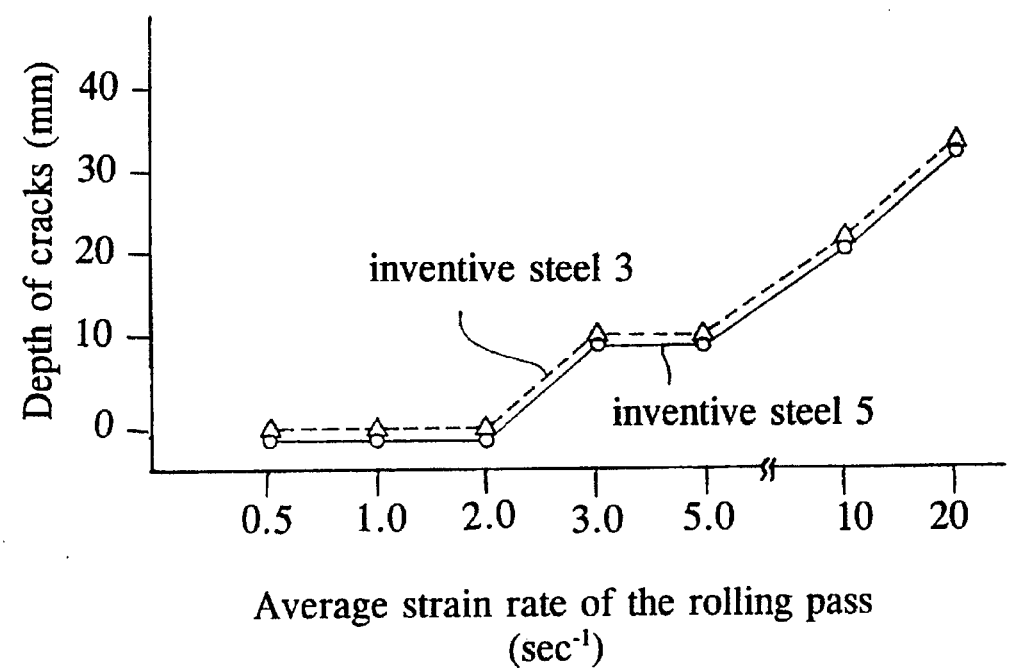
FIG. 2 is a graphical illustration showing the variation of the depth of cracks on edges of the hot rolled steel sheet versus the variation of the average strain rate of the rolling pass during a hot rolling of the present invention steel.

Meanwhile, as shown in FIG. 2, the inventive steels 3 and 5 showed no generation of cracks, when an average strain rate of 2.0 sec$^{-1}$ per pass was applied. However, when an average strain rate of 3.0 sec$^{-1}$ or more per pass was applied, cracks having depths of 10–30 mm were generated. This is due to the fact that, as the strain rate is increased, the deformation speed becomes fast, thereby imposing an impact load.

Therefore, if the high manganese steel of the present invention is to be hot-rolled without any cracks, a reduction ratio of less than 7% per pass and an average strain rate of less than 2.0 sec$^{-1}$ per pass should be applied.

EXAMPLE 4

In order to set a total reduction ratio which is necessary for the conversion of the brittle cast structures (which cause the generation of cracks during a hot rolling of the high manganese steel) into tough rolled structures (in which cracks are not formed during a hot rolling and the following processing by the sufficient recrystallization). That is, a ingot and a continuous casting slab of the high manganese steel of the inventive steels 3 and 5 of Example 1 were heated at 1250° C. Then the initial stage of hot rolling was carried out by applying a reduction ratio of 7% per pass and an average strain rate of 2.0 sec$^{-1}$ per pass, as shown in Example 3, until the total reduction ratio reached 0%, 20%, 30%, 40%, 50% and 60%, respectively. Then the samples which had reached the above mentioned total reduction ratio were heated again to 1250° C., and then, a hot rolling was carried out by applying a high reduction ratio of 20% per pass and a high average strain rate of 20 sec$^{-1}$ per pass. Then the cracks on the edges and on the surfaces were measured, and the results are illustrated in FIG. 3.

Thus when a initial hot rolling was carried out on the high manganese steel by applying a low reduction ratio, and then a hot rolling was carried out again by applying a high reduction ratio, cracks were not formed. This indicates the fact that the weak casting structures were converted into the tough rolling structures.

Figure 3:
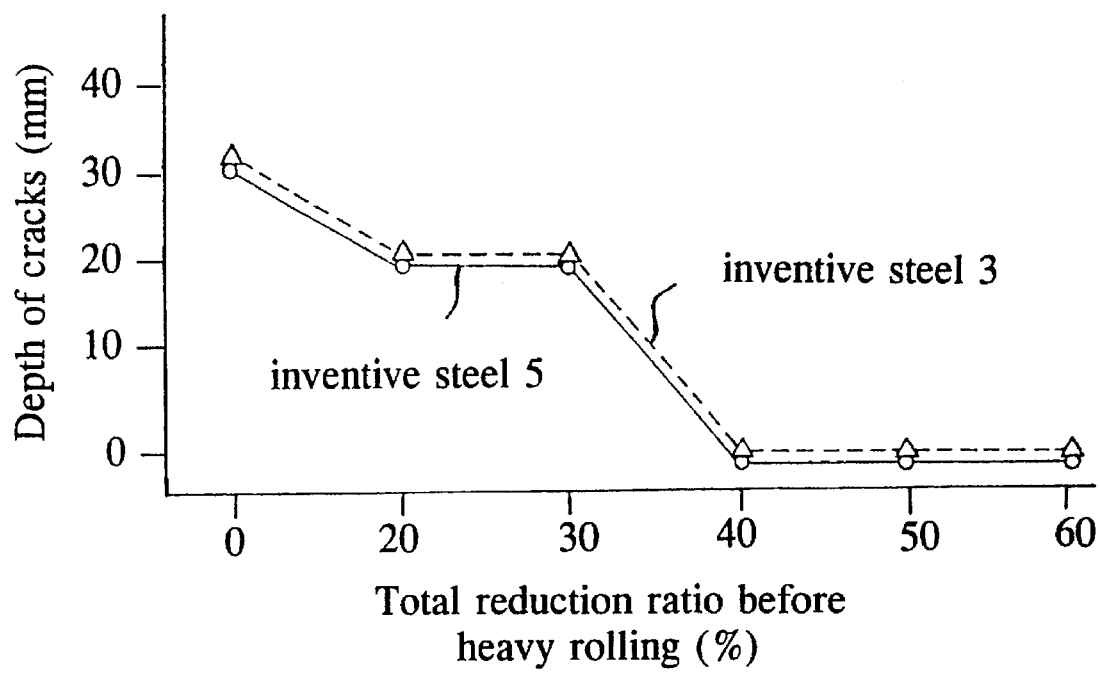
FIG. 3 is a graphical illustration showing the variation of the depth of cracks versus the variation of the total accumulated reduction ratio when a low initial reduction ratio is applied.

As shown in FIG. 3, the hot rolled steel sheet in which a low reduction ratio per pass was applied up to the total reduction ratio of 40% or more showed no cracks, while the hot rolled steel sheet in which a low reduction ratio per pass was applied up to the total reduction ratio of less than 30% showed cracks having depths of 20–30 mm.

That is, it is confirmed that, if the hot rolling is carried out by applying a low reduction ratio per pass until the total reduction ratio of 40% or more is attained, then the weak cast structures are completely converted into the tough rolled structures.

Therefore, to inhibit the generation of cracks during hot rolling, a rolling with a low reduction ratio has to be carried out until the total reduction ratio reaches 40%. Upon reaching the total reduction ratio of 40%, the steel is completely converted into a rolled structure, and therefore, even if the rolling by a high reduction ratio is carried out thereafter, cracks will not be generated.

EXAMPLE 5

In order to inhibit the formation of the surface oxide scales on the hot rolled high manganese steel, and to prevent the formation of the tiny surface cracks, the surfaces of the ingot and the continuous casting slab of the inventive steel 3 of Example 1 were coated with a coating material which contains chrome as the main ingredient, and contains $SiO_2$ MgO and $Fe_2O_3$ by 20%. Then the ingot and the continuous casting slab were heated at 1200°–1350° C. for 5 hours, and then, these specimens were mounted to the cross sectional direction to measure the thickness of surface scales. Further, the thickness of the depletion layer of the alloying element, the depth of the grain boundary oxidation and the variation of the content of the alloying elements were checked, and the results are shown in Table 4 and in FIG. 4.

TABLE 4

| Heating temp (°C.) | Coating matl | Thickness of scale (mm) | Depth of depltn (mm) | Depth of G. B oxdtn (mm) |
| --- | --- | --- | --- | --- |
| 1350 | Coated | 0.6 | 0 | 0 |
| | Not coated | 2.5 | 0.2 | 1.2 |
| 1300 | Coated | 0.4 | 0 | 0 |
| | Not coated | 2.2 | 0.2 | 1.0 |
| 1250 | Coated | 0.3 | 0 | 0 |
| | Not coated | 2.0 | 0.15 | 0.8 |
| 1200 | Coated | 0.2 | 0 | 0 |
| | Not coated | 2.0 | 0.15 | 0.7 |

G. B: Grain boundary.

As shown in Table 4 above, the thickness of the surface scale layer was much thinner in the case of the coating than in the case of not coating. Further, in the case where the coating material was coated, the depletion layer of the alloying elements and a grain boundary oxidation were not formed. On the other hand, in the case where the coating material was not coated, the depletion layer of alloying element and a grain boundary oxidation were generated with a thickness of 0.15–0.2 mm and with a depth of 0.7–1.2 mm, respectively.

Figure 4:
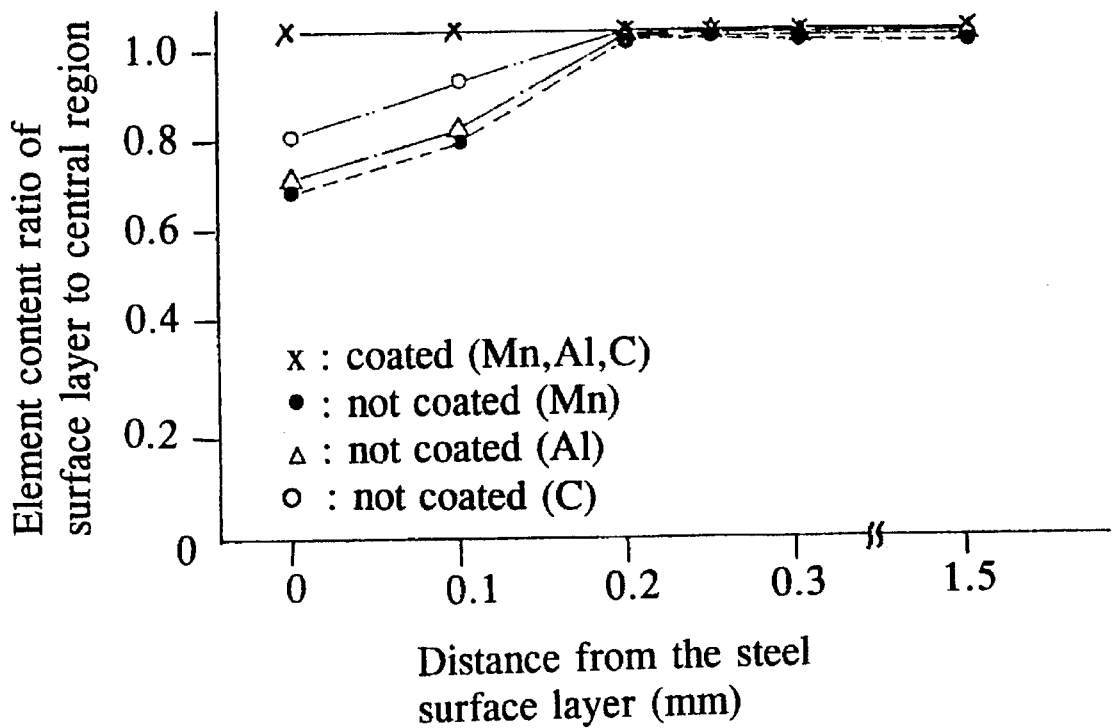
FIG. 4 is a graphical illustration showing the variation of the chemical composition in the surface layer compared with the central region after heating the ingot or the continuous casting slab of the present invention steel at 1300° C. for 5 hours with and without coating material.

Further as shown in FIG. 4, in the case where the coating material was coated, there was no variation in the contents of manganese, aluminum and carbon after heating to 1300° C. On the other hand, in the case where the coating material was not coated, the contents of the above mentioned elements are decreased by 10 to 30%, compared with the inner region of the steel sheet. Therefore it is confirmed that the coating of the coating material prevents the formation of the depletion layer of alloying elements.

Then, the ingot and the continuous casting slab which were heated as described above were hot-rolled, and then, an acid wash was carried out for them. Then the hot rolled sheet was ground off by 0.1 mm by using a belt grinder. Then the surface defects were inspected, and the results are shown in Table 5 below.

Under this condition, no difference is seen between the steel ingot and the continuous casting slab.

TABLE 5

| Heating temp (°C.) | Coating matl | Oxide scale after grinding of one round | Cracks after grinding of one round |
| --- | --- | --- | --- |
| 1350 | Coated | Remain | None |
| | Not coated | Remain | Remain |
| 1300 | Coated | None | None |
| | Not coated | Remain | Remain |
| 1250 | Coated | None | None |
| | Not coated | Remain | Remain |
| 1200 | Coated | None | None |
| | Not coated | Remain | Remain |

As shown Table 5 above, in the case where the heating is made to 1350° C., the scales remained even after the grinding of the hot rolled steel sheet regardless of whether the coating material was coated or not. However, in the case where the heating was made to 1300° C., 1250° C. and 1200° C., respectively, the oxide scales remained when the heat resistant coating material was not coated, but, when the coating material was coated, the oxide scales were completely removed after the surface grinding.

Further, in the case where the heat resistant coating material was coated, tiny cracks were not seen after the surface grinding. However, in the case where the coating material was not coated, tiny cracks remained after one round of surface grinding. These surface cracks were completely removed after the second grinding or the third grinding.

As described above, if the coating material is coated on the surfaces of the steel ingot and the continuous casting slab, a direct contact with the high temperature oxidizing atmosphere within the heating furnace can be avoided, with the result that the formation of the oxide scales is inhibited, and the formation of the depletion layer of alloying elements can be prevented. Further, by coating the coating material, the surface oxide scales formed on the hot rolled steel sheet can be easily removed through a surface grinding, and the generation of tiny cracks on the surface of the steel sheet can be prevented.

EXAMPLE 6

In order to inhibit the generation of the surface oxide scales and to prevent tiny cracks on the surface of the high manganese steel sheet, the ingot and the continuous casting slab of the inventive steel 3 of Example 1 were heated under a non-oxidizing atmosphere purged with nitrogen and argon gases. The ingot and the continuous casting slab were also heated in the atmospheric air to compare with the non-oxidizing atmosphere. Then tests were carried out for these two cases. Here, the proportion of the nitrogen and argon was 99.5%, and an electric resistance heating was carried out in the form of an indirect heating.

The ingot and the continuous casting slab were heated at a temperature range of 1200°–1350° C. for 5 hours, and then, the thickness of the oxide scales which were formed on the surfaces were measured by the observation for the cross section. Further, the thickness of the depletion layer of alloying element and the depth of the oxidation of the grain boundaries were inspected, and the results are shown in Table 6 below.

TABLE 6

| Heating temp. (°C.) | Furnace atm | Thickness of scale (mm) | Depletion thickness (mm) | Depth of G. boundary oxidation (mm) |
| --- | --- | --- | --- | --- |
| 1350 | Nitrogen | 0.3 | 0 | 0 |
|  | Argon | 0.3 | 0 | 0 |
|  | None (air) | 2.5 | 0.2 | 1.2 |
| 1300 | Nitrogen | 0.2 | 0 | 0 |
|  | Argon | 0.2 | 0 | 0 |
|  | None (air) | 2.2 | 0.2 | 1.0 |
| 1250 | Nitrogen | 0.1 | 0 | 0 |
|  | Argon | 0.1 | 0 | 0 |
|  | None (air) | 2.0 | 0.15 | 0.8 |
| 1200 | Nitrogen | 0.1 | 0 | 0 |
|  | Argon | 0.1 | 0 | 0 |
|  | None (air) | 2.0 | 0.15 | 0.7 |

As shown in Table 6 above, the thickness of the scale layers heated under a non-oxidizing atmosphere was thinner than one heated under being coated with coating material as in Example 5. Further, in the case where the heating was carried out under a non-oxidizing atmosphere, the depletion layer of the alloying elements and the oxidation of the grain boundaries are also not generated as in the case where the coating material was coated as in Example 5.

That is, in the case where the heating was carried out under the non-oxidizing atmosphere as in the case of Example 5 in which the coating material was coated, the generation of the scales was inhibited, and the formation of the depletion layer of the alloying elements was prevented, as well as preventing the oxidation of the grain boundaries.

Meanwhile, the thin scale layer which was formed during the heating of the ingot and continuous casting slabs under the non-oxidizing atmosphere could be removed by the jet of a high pressure water just before carrying out the hot rolling. Then the heated ingot and continuous casting slabs were hot-rolled down to a thickness of 3 mm, and then, a pickling wash was carried out. When the surfaces of pickled steel sheet were ground off by 0.1 mm using a belt grinder to check the surface condition, there were no scales and tiny cracks.

According to the present invention as described above, alloying elements are added into a high manganese steel of Fe-Mn-Al-C system to strengthen the grain boundaries of the columnar crystals, so that a high manganese steel having an improved hot workability can be obtained. Further, during the hot rolling of the high manganese steel, the initial rolling conditions are controlled, so that a hot rolled steel sheet having a good surface condition without any cracks can be obtained. This steel can be used in the manufacturing field of automobiles in which a superior formability and high strengths are required.

What is claimed is:

1. A process for manufacturing a crack-free hot rolled high manganese steel sheet, comprising the steps of:

preparing a steel ingot or a continuous casting slab comprising in weight %: less than 1.5% of C, 15.0–35.0% of Mn, 0.1–6.0% of Al, and balance of Fe and incidental impurities; and further comprising one or more elements selected from a group consisting of 0.0005–0.04% of B, 0.0005–0.050% of Ti, 0.0005–0.050% of Zr, 0.0005–0.040% of La, 0.0005–0.040% of Ce, and 0.0005–0.030% of Ca;

heating the ingot or the continuous casting slabs of the said steel to a temperature range of 1150°–1300° C.;

hot rolling by applying a low reduction ratio below 7% per pass and an average strain rate below 2.0 sec$^{-1}$ per pass, until a total reduction ratio reaches 40%; and hot rolling by applying a high reduction ratio after reaching said total reduction ratio of 40%.

2. A process for manufacturing a crack-free high manganese steel, comprising the steps of:

preparing an ingot or a continuous casting slab comprising in weight %: less than 1.5% of C, 15.0–35.0% of Mn, 0.1–6.0% of Al, and balance of Fe and incidental impurities; further comprising one or more elements selected from a group consisting of less than 0.6% of Si, less than 5.0% of Cu, less than 1.0% of Nb, less than 0.5% of V, less than 9.0% of Cr, less than 4.0% of Ni, and less than 0.2% of N; and further comprising one or more elements selected from a group consisting of 0.0005–0.04% of B, 0.0005–0.050% of Ti, 0.0005–0.050% of Zr, 0.0005–0.040% of La, 0.0005–0.040% of Ce, and 0.0005–0.030% of Ca;

heating the ingot or the continuous casting slabs of a said steel to a temperature range of 1150°–1300° C.;

hot rolling by applying a low reduction ratio below 7% per pass and an average strain rate below 2.0 sec$^{-1}$ per pass, until a total reduction rate reaches 40%; and hot rolling by applying a high reduction ratio after reaching said total reduction rate of 40%.

3. The process as claimed in claim 1, wherein a coating material is coated to the surfaces of the ingot or the continuous casting slabs of said steel, and then, the heating and hot rolling steps are carried out.

4. The process as claimed in claim 1, wherein the ingot or the continuous casting slabs of said steel is heated under a non-oxidizing atmosphere purged with nitrogen or argon gas, and then, the hot rolling step is carried out.

5. The process as claimed in claim 2, wherein a coating material is coated to the surfaces of the ingot or the continuous casting slabs of said steel, and then, the heating and hot rolling steps are carried out.

6. The process as claimed in claim 2, wherein the ingot or the continuous casting slabs of said steel is heated under a non-oxidizing atmosphere purged with nitrogen or argon gas, and then, the hot rolling step is carried out.

* * * * *

UNITED STATES PATENT AND TRADEMARK OFFICE
CERTIFICATE OF CORRECTION

PATENT NO. : 5,647,922
DATED : July 15, 1997
INVENTOR(S) : Tai Woung Kim, Young Gil Kim, and Shin Hwa Park It is certified that error appears in the above-indentified patent and that said Letters Patent is hereby corrected as shown below:

Column 2 Line 66 "Fin" should read --Mn--.

Column 3 Line 18 "0.00050" should read --0.0005--.

Column 7 Line 8 "Al-C C" should read --Al-C--.

Column 8 Lines 16-17 "1/" and "2" should read --1/2--.

Signed and Sealed this

Twentieth Day of January, 1998

Attest:

BRUCE LEHMAN

Attesting Officer

Commissioner of Patents and Trademarks